United States Patent
Chu et al.

(10) Patent No.: US 10,018,105 B2
(45) Date of Patent: Jul. 10, 2018

(54) ENGINE STRUCTURE FOR VEHICLE

(71) Applicants: Hyundai Motor Company, Seoul (KR); KIA Motors Corporation, Seoul (KR)

(72) Inventors: Dong Ho Chu, Ansan-si (KR); Nahm Roh Joo, Yongin-si (KR); Yang Geol Lee, Hwaseong-si (KR); Jong Il Park, Seoul (KR); Yong Hoon Kim, Seoul (KR); Myung Gu Ha, Suwon-si (KR); Dong Hee Han, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 51 days.

(21) Appl. No.: 15/218,163

(22) Filed: Jul. 25, 2016

(65) Prior Publication Data
US 2017/0145904 A1  May 25, 2017

(30) Foreign Application Priority Data

Nov. 23, 2015  (KR) .................. 10-2015-0163761

(51) Int. Cl.
*F02B 31/04* (2006.01)
*F02F 1/42* (2006.01)
(Continued)

(52) U.S. Cl.
CPC ............ *F02B 31/04* (2013.01); *F02B 31/085* (2013.01); *F02F 1/425* (2013.01); *F02F 1/4242* (2013.01); *F02M 61/145* (2013.01); *Y02T 10/146* (2013.01)

(58) Field of Classification Search
CPC .. F02B 31/04; F02B 31/085; F02B 2031/006; F02B 31/06; F02F 1/425; F02F 1/4242;
(Continued)

(56) References Cited

U.S. PATENT DOCUMENTS

| 5,273,014 A | * | 12/1993 | Mitobe | .................. F02B 31/00 123/308 |
| 5,636,613 A | * | 6/1997 | Aoyama | .............. F02B 31/087 123/432 |
| 2014/0165960 A1 | * | 6/2014 | Han | ....................... F02B 31/04 123/306 |

FOREIGN PATENT DOCUMENTS

| JP | 08296535 A | * | 11/1996 |
| JP | H08-296535 A | | 11/1996 |

(Continued)

OTHER PUBLICATIONS

JP 08296535 A—Translation (English).*

*Primary Examiner* — Joseph Dallo
*Assistant Examiner* — Scott A Reinbold
(74) *Attorney, Agent, or Firm* — Brinks Gilson & Lione

(57) ABSTRACT

The present disclosure provides an engine structure for a vehicle. The engine structure includes: an intake port, a port plate provided in the single flow path of the intake port, and an injector. The port plate is longitudinally parallel to the flow path of the intake port so as to divide the flow path of the intake port into upper and lower flow paths, and the port plate includes an extension portion formed on part of a downstream end of the port plate such that the extension portion of the downstream end of the port plate extends longer than other portion of the downstream end of the port plate. In particular, the injector is provided in the intake port, and sprays fuel beyond the extension portion so as to inhibit the fuel from adhering to the port plate.

3 Claims, 2 Drawing Sheets

(51) Int. Cl.
*F02M 61/14* (2006.01)
*F02B 31/08* (2006.01)

(58) Field of Classification Search
CPC ........ F02F 1/4214; F02F 1/4235; F02F 1/242;
F02M 61/145; F02M 35/10216; F02M
35/10262; F02M 69/044; F02M
35/10072; F02M 61/1853; F02M
35/1085; F02D 41/3094; F02D 2009/0206
USPC .................................................. 123/308, 306
See application file for complete search history.

(56) References Cited

FOREIGN PATENT DOCUMENTS

| | | |
|---|---|---|
| JP | 2015-68282 | 4/2015 |
| KR | 1997-0001923 | 1/1997 |
| KR | 1997-0016057 | 4/1997 |
| KR | 10-2004-0090466 | 10/2004 |
| KR | 10-1382312 B1 | 4/2014 |

\* cited by examiner

ENGINE STRUCTURE FOR VEHICLE

CROSS REFERENCE TO RELATED APPLICATION

The present application claims priority to and the benefit of Korean Patent Application No. 10-2015-0163761, filed Nov. 23, 2015, which is incorporated herein by reference in its entirety.

FIELD

The present disclosure generally relates to an engine structure for a vehicle. More particularly, the present disclosure relates to an engine structure for a vehicle configured to inhibit or prevent fuel from adhering to a port.

BACKGROUND

The statements in this section merely provide background information related to the present disclosure and may not constitute prior art.

Generally, technologies using various methods of spraying fuel, a method of controlling intake air, and a structure of an intake port are developed and applied to improve engine efficiency, such as fuel efficiency, in a vehicle, especially in an engine of a vehicle.

As a technology for improving the engine efficiency for a vehicle, a method of mixing fuel and intake air introduced into a combustion chamber has been developed, and also a method of having the fuel of an air-fuel mixture being uniformly dispersed has been developed, thereby improving combustion efficiency of the engine.

Especially, as a method of improving the mixing performance of the fuel and the air, a method of controlling the flow of the intake air by changing a shape of the intake port or installing a port plate inside the intake port may be applied, thereby inducing a tumble phenomenon in the intake air introduced into the combustion chamber.

The tumble phenomenon means that the intake air introduced into the combustion chamber forms a vortex by being pulled from top to bottom in the combustion chamber. Further, the mixing performance of the fuel and the intake air inside the combustion chamber may be improved by the swirling intake air due to the tumble phenomenon, thereby improving the combustion efficiency.

We have discovered that, in a method of spraying fuel from a nozzle hole of an injector provided in the intake port, when the fuel sprayed from the injector adheres to a flow path of the intake port, fuel efficiency of an engine is adversely affected. Thus, it is desired to inhibit or prevent the fuel from adhering to the flow path of the intake port to improve the engine efficiency.

SUMMARY

The present disclosure proposes an engine structure for a vehicle configured to inhibit or prevent fuel sprayed from an injector from adhering to an intake port, and configured to effectively increase combustion efficiency by improving the mixing performance of fuel and air.

According to one aspect of the present disclosure, an engine structure includes: an air intake port, an injector, and a port plate. The intake port is configured such that a single flow path in an upstream portion of the intake port branches off into a pair of branch flow paths in a downstream portion of the intake port, and the port plate is formed in a plate shape, and provided in the single flow path of the intake port in a state of being longitudinally parallel to the flow path of the intake port so as to divide the flow path of the intake port into upper and lower flow paths. The port plate includes an extension portion formed on a first portion of a downstream end of the port plate such that the first portion of the downstream end of the port plate extends longer than a second portion of the downstream end of the port plate. The injector is provided in the intake port, and configured to spray fuel excluding the extension portion from being sprayed with the fuel so as to inhibit or prevent the fuel from adhering to the port plate.

The engine structure may further include: a variable flap provided in an upstream portion of the port plate, and configured to be rotated so as to selectively block air flow from the lower flow path of the upper and lower flow paths of the intake port divided by the port plate.

The extension portion may be configured to extend into a first branch flow path of the pair of branch flow paths so as to induce swirl in a combustion chamber, and the injector may be configured to spray fuel to a second branch flow path of the pair of branch flow paths.

The downstream end of the port plate may be formed in a stepped shape, and a length of the extension portion of the port plate may be uniform.

According to the present disclosure, the combustion efficiency of the engine can be improved by inhibiting or preventing the fuel from adhering to the port plate inducing a tumble phenomenon inside the combustion chamber of the engine, and by inducing the swirl phenomenon inside the combustion chamber.

Especially, the port plate is provided with the extension portion such that only the first portion of the downstream end of the port plate extends longer, and the injector is configured to spray the fuel excluding the extension portion of the port plate from being sprayed with the fuel. Thus, the fuel can be effectively inhibited or prevented from adhering to a surface of the port plate, and at the same time, swirl is efficiently generated in the flow of the intake air introduced into the combustion chamber.

Furthermore, the extension portion of the port plate is provided inside the first branch flow path of the pair of branch flow paths formed in the downstream portion of the intake port. Accordingly, asymmetry in the intake air introduced from each of the pair of branch flow paths occurs, and thus, swirl is induced. Thus, an advantageous effect on an improvement in the mixing performance of the intake air and the fuel is generated due to interaction between the swirls of the intake air and the fuel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

DETAILED DESCRIPTION

Figure 1:
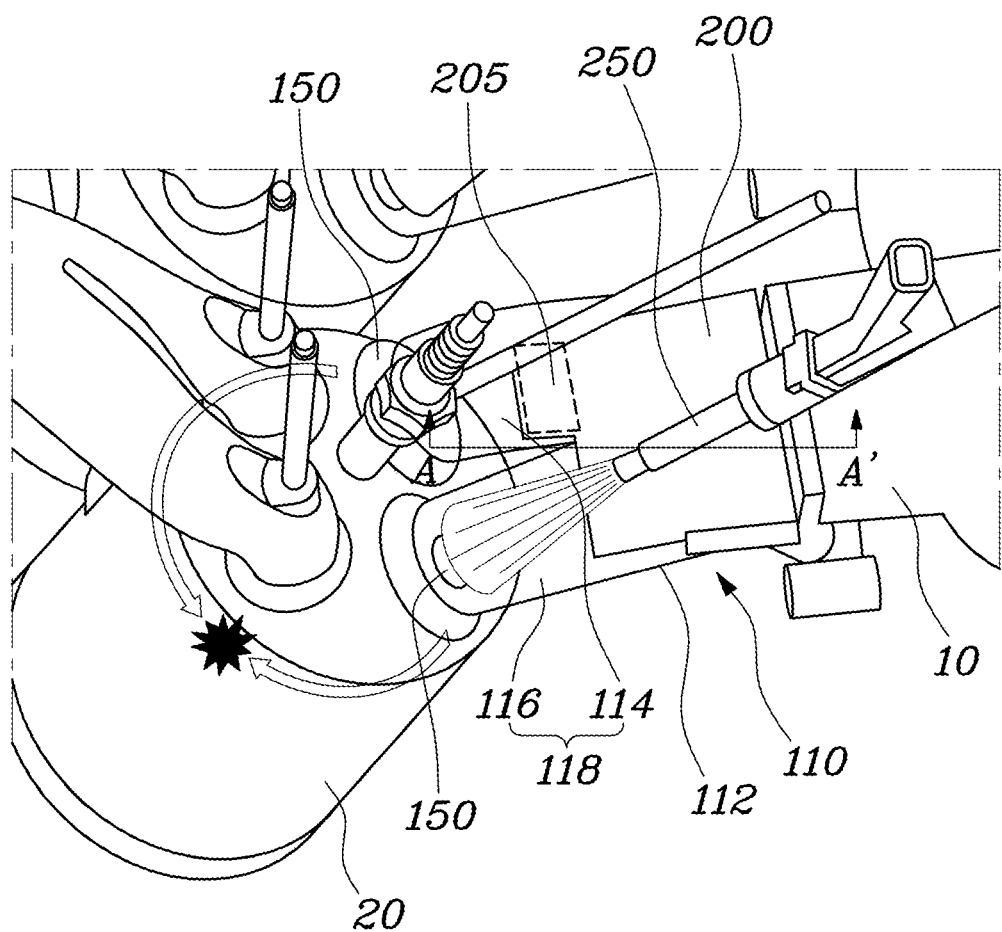
FIG. 1 is a view illustrating an engine structure for a vehicle.

The following description is merely exemplary in nature and is not intended to limit the present disclosure, application, or uses. It should be understood that throughout the drawings, corresponding reference numerals indicate like or corresponding parts and features.

Figure 2:
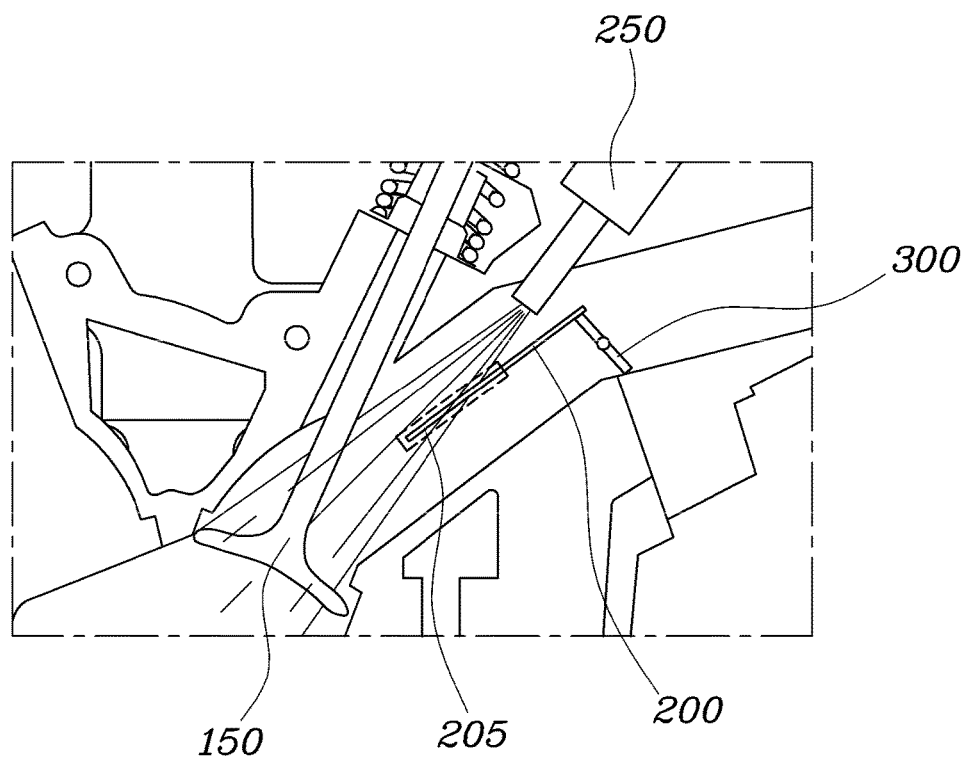
FIG. 2 is a sectional view taken along line A-A' of FIG. 1.

FIGS. 1 to 2 illustrates an engine structure for a vehicle according to the present disclosure. The engine structure includes: an intake port 110, a port plate 200, and an injector 250. The intake port 110 is configured such that a single flow path 112 in an upstream portion of the intake port branches off in a pair of branch flow paths 118 (i.e., a pair of branch ports) in a downstream portion of the intake port, and the port plate 200 is formed in a plate shape and provided in the single flow path 112 of the intake port 110. In particular, the port plate 200 is disposed longitudinally parallel to the flow path of the intake port 110 so as to divide the flow path of the intake port 110 into upper and lower flow paths, and the port plate 200 includes an extension portion 205 extended from the port plate 200 in a downstream direction of the intake port 110 (i.e., toward a combustion chamber 20), namely a first portion of a downstream end of the port plate 200. The first portion of the downstream end of the port plate extends longer in the downstream direction than other downstream portion of the port plate 200 (i.e., a second portion of the downstream end of the port plate). The injector 250 in the intake port 110 is configured to spray fuel to the side of the extension portion 205 so that the extension portion 205 is not wet by sprayed the fuel so as to inhibit or prevent the fuel from adhering to the port plate 200.

Especially, the extension portion 205 forming the first portion of the downstream end of the port plate 200 induces a tumble phenomenon in intake air introduced into a combustion chamber 20 of an engine, and a swirl is induced by generating asymmetry in the intake air introduced into the combustion chamber 20 in such a way that the extension portion 205, in particular, is formed in a first branch flow path 114 of the branch flow paths 118 of the intake port 110.

Furthermore, the injector 250 is configured to spray fuel to the side of the extension portion 205, and thus the fuel sprayed from the injector 250 is inhibited or prevented from adhering to the port plate 200 or to the extension portion 205, or the fuel adhesion to the port plate 200 may be significantly reduced. Further, the fuel and the intake air, which are eccentrically introduced based on the axis of the combustion chamber 20, flow in a swirling manner to be opposite to each other. Thus, flows of the fluids collide with each other inside the combustion chamber 20, and the fuel is dispersed, thereby improving the mixing performance of the fuel and the intake air.

In this case, the mixing performance of the fuel and the intake air means the extent of dispersion such that the fuel introduced into the combustion chamber 20 is uniformly dispersed in the intake air of the combustion chamber 20. As the mixing performance is improved, which is advantageous to a complete combustion, combustion efficiency of the engine is improved.

In this regard, the present disclosure is described in detail as follows. The intake port 110 is configured such that the single flow path 112 in the upstream portion of the intake port diverges into a pair of branch flow paths 118 in the downstream portion of the intake port. FIG. 1 illustrates that the single flow path 112 of the intake port 110 branches off into the pair of branch flow paths 114, 116 (collectively 118) in the downstream portion of the intake port.

The intake port 110 is formed as the single flow path 112 in the upstream portion, which is coupled to an intake manifold, and then the intake port 110 is formed as the pair of branch flow paths 114, 116 in the downstream portion adjacent to the combustion chamber 20. Thus, the amount of intake air introduced into the combustion chamber 20 per hour via the pair of branch flow paths 118 may be increased compared to the amount of intake air per hour introduced via the single flow path 112.

The number of branch flow paths 118 is provided, in one form, as a pair, or may be provided as more than two paths, as desired by a corresponding engine. Furthermore, the branch flow paths 118 in the downstream portion of the intake port 110 communicate into the combustion chamber 20, and intake air valves 150 for controlling a flow of the intake air from each of the branch flow paths 118 are provided in a cylinder head.

Meanwhile, the port plate 200 formed in a plate shape, is provided in the single flow path 112 of the intake port 110 in a state of being longitudinally parallel to the flow path of the intake port 110 so as to divide the flow path of the intake port 110 into the upper and lower flow paths. The extension portion 205 forms the first portion of the downstream end of the port plate such that the first portion of the downstream end of the port plate extends beyond the second portion of the downstream end of the port plate.

The port plate 200 may control the flow of the intake air introduced into the combustion chamber 20 so that the tumble phenomenon may occur in the intake air. The tumble phenomenon means that the intake air introduced into the combustion chamber 20 forms a vortex by being pulled from top to bottom in the combustion chamber 20 or by being introduced in different directions.

The tumble phenomenon is advantageous in that the fuel is uniformly dispersed in the intake air of the combustion chamber 20, thereby improving the mixing performance. As the mixing performance of the intake air and the fuel in the combustion chamber 20 is improved, which is advantageous to the complete combustion, the combustion efficiency is improved.

As described above, the port plate 200, which induces the tumble phenomenon in the intake air so as to improve the combustion efficiency, is configured to divide the flow path of the intake port 110 into the upper and lower flow paths. Further, the port plate is configured to partially restrict the flowing area of the intake air, and the flow speed of the intake air is increased, thereby easily generating a tumble phenomenon.

The port plate 200 may be provided by various methods and in various shapes. In one form, the port plate 200 is provided in a state of being longitudinally parallel to the flow path of the intake port 110, and a variable flap 300 is provided in the upstream portion of the intake port 110, in which the intake manifold 10 is located, so as to control the flow of the intake air from the upper or lower flow path of the intake port 110 divided by the port plate 200.

Since the variable flap 300 is provided, when the tumble phenomenon inside the combustion chamber 20 is desired, the flow of the intake air from the upper or lower flow path of the port plate 200 is blocked by the variable flap 300, and the intake air flows via the flow path that is not blocked by the variable flap 300. Thus, the flowing area of the intake air is decreased and the flow speed of the intake air is increased, which is advantageous in that the tumble occurs.

Regarding a shape and a configuration of the port plate 200, various methods, in addition to the form described above, may be applied by those skilled in the art.

Meanwhile, in an aspect of a layout considering a nozzle hole of the injector 250 and the intake air valves 150, in one form, the port plate 200 is provided in the single flow path 112 in the upstream portion of the intake port 110.

Furthermore, the port plate 200 formed in a plate shape in a state of being longitudinally parallel to the intake port 110 (i.e., paralleled to the air flow path of the intake port 110) is configured to stabilize the flow of the intake air passing over the port plate 200, and is provided with the extension portion 205 configured such that the first portion of the downstream end of the port plate extends longer than the second portion of the downstream end of the port plate 200, which is formed in an asymmetrical shape. In one form, the extension portion 205 may be eccentrically provided in any one portion of the downstream end of the port plate 200 excluding the center portion.

Meanwhile, the injector 250 is provided in the cylinder head or the intake manifold 10, and the nozzle hole of the injector 250 is located above the intake port 110. Further, the injector is configured to spray the fuel to the side of the extension portion 205 so as to inhibit or prevent the fuel from adhering to the port plate 200. FIG. 1 illustrates that the injector 250 sprays the fuel beyond the extension portion 205.

In the present disclosure, the injector 250 is configured to spray the fuel to the intake port 110, and thus, the fuel is supplied into the combustion chamber 20. In this case, due to the structure of the intake port 110, which is compact for an advantage in layout, the fuel sprayed from the injector 250 may adhere to a surface of the port plate 200, and especially, the fuel may easily adhere to a surface of the extension portion 205 formed in the downstream end of the port plate 200.

Accordingly, the port plate 200 is provided with the extension portion 205, which is formed only on the first portion of the downstream end of the port plate 200, and the injector is configured to spray the fuel in a way that the sprayed fuel doe not contact with the extension portion 205. Thus, this may be achieved by setting up a disposition location of the nozzle hole of the injector 250 above the intake port 110 or adjusting a spray angle of the injector 250.

That is, the extension portion 205 of the port plate 200 is formed only on the first portion of the downstream end of the port plate so as to easily reserve a space to which the fuel is sprayed. Further, the injector 250 is configured to spray the fuel to the side of or beyond the extension portion 205 of the port plate 200, thereby inhibiting or preventing the fuel from adhering to the port plate 200. Thus, the combustion efficiency may be improved.

Meanwhile, as shown in FIGS. 1 to 2, the engine structure for a vehicle further includes: the variable flap 300 provided in the upstream portion of the port plate 200, and configured to be rotated so as to selectively block the air flow from the lower flow path of the upper and lower flow paths of the intake port 110 divided by the port plate 200.

As described above, the flow of the intake air from the upper or lower flow path of the intake port 110 divided by the port plate 200 is controlled by the variable flap 300. Furthermore, in another form, the variable flap 300 may control the flow of the intake air from the lower flow path of the intake port 110 divided by the port plate 200.

The variable flap 300 may be formed in a plate shape, and provided in the upstream portion of the port plate 110.

Further, a first end of the variable flap 300 may come into contact with the port plate 200.

Furthermore, in the form of the variable flap 300 described above, the variable flap 300 is provided on the upper or lower flow path of the intake port 110, and a rotation shaft is formed in a first portion of the variable flap 300. Thus, the variable flap 300 is selectively rotated by an actuator, thereby being capable of opening or closing the lower flow path of the intake port 110.

Regarding the coupling and actuating methods of the variable flap 300, various methods may be applied by those skilled in the art so as to control the flow of the intake air from the lower flow path of the intake port 110 divided by the port plate 200.

In the variable flap 300 described above, the flow speed of the intake air introduced into the combustion chamber 20 may be increased by concentrating the flow of the intake air by the port plate 200 on the upper flow path of the intake port in such a way that the flow of the intake air from the lower flow path of the intake port 110 is selectively controlled.

Meanwhile, as shown in FIGS. 1 to 2, in the engine structure for a vehicle, the extension portion 205 is configured to extend into the first branch flow path 114 of the pair of branch flow paths 118, and the injector 250 is configured to spray the fuel to the second branch flow path 116 of the pair of branch flow paths 118.

More specifically, the extension portion 205, which induces the swirl phenomenon inside the combustion chamber 20 by generating the asymmetry in the flow of the intake air, is formed on the downstream end of the port plate 200. Further, the extension portion 205 extends from the downstream end of the port plate 200 disposed in the single flow path 112 of the intake port 110, and is formed inside the first branch flow path 114 of the pair of the branch flow paths 118 formed in the downstream portion of the intake port 110.

Accordingly, the flow speed of the intake air introduced from the first branch flow path 114 having the extension portion 205 is faster than the flow speed of the intake air introduced from the second branch flow path 116, and thus, asymmetry occurs in the flow of intake air introduced from the pair of branch flow paths 118 into the combustion chamber 20.

The intake air introduced into the combustion chamber 20 eccentrically flows, and a swirl phenomenon is induced, thereby improving the mixing performance of the intake air and the fuel in the combustion chamber 20. Thus, this is advantageous for complete combustion, thereby improving the fuel efficiency.

Meanwhile, the injector 250 is configured to spray the fuel, but not including the extension portion 205, so as to inhibit or reduce the fuel from adhering to the surface of the port plate 200. The injector 250 is configured to spray the fuel to the second branch flow path 116, in which the extension portion 205 is not formed, so as to avoid spraying the fuel to the extension portion 205, which is configured to extend into the first branch flow path 114.

Accordingly, the fuel sprayed from the injector 250 is inhibited or prevented from adhering on the intake port 110, especially on the surface of the port plate 200. Further, the fuel is introduced into the combustion chamber 20 via the second branch flow path 116 of the pair of branch flow paths 118 symmetrically provided based on the combustion chamber 20, and thus, the fuel introduced into the combustion chamber 20 eccentrically flows, thereby generating a swirl phenomenon in the flow of the fuel. FIG. 1 illustrates a swirl relation between the swirl in the flow of the intake air and the swirl in the flow of the fuel.

As described above, the flow of the fuel and the intake air inside the combustion chamber 20 forms the swirls opposite to each other, and the swirls disperse the fuel in the combustion chamber 20 by colliding with each other. The collision of the swirls promotes the mixing performance of the fuel and the intake air inside the combustion chamber 20.

The extension portion 205 is provided in the first branch flow path 114, and the injector 250 sprays the fuel to the second branch flow path 116. Accordingly, the flow of the fuel and the intake air forms swirls opposite to each other inside the combustion chamber 20, and the fuel, whose extent of dispersion is increased, is uniformly dispersed inside the combustion chamber 20 along the flow of the intake air, in which tumble and swirl are induced, due to a collision between the swirls. Thus, the mixing performance of the intake air and the fuel is improved.

Meanwhile, as shown in FIGS. 1 to 2, in the engine structure for a vehicle, the downstream end of the port plate 200 is formed in a stepped shape, and a length of the extension portion 205 of the port plate may be uniform.

The extension portion 205 is configured to generate the asymmetry in the flow of the intake air, and at the same time, is configured to easily reserve the space to which the fuel is sprayed. Thus, when the length of the extension portion 205 of the port plate is not uniform, for example, the extension portion is formed in a curved shape, unintended variation in the flow of the intake air may occur. Accordingly, swirl and tumble desired inside the combustion chamber 20 are not efficiently induced, and thus, an effect of the present disclosure may be decreased.

Accordingly, in one form, the length of the extension portion 205 may be uniform, and thus, the downstream end of the port plate 200 is formed in the stepped shape.

Although forms of the present disclosure have been described for illustrative purposes, those skilled in the art will appreciate that various modifications, additions and substitutions are possible, without departing from the scope and spirit of the present disclosure.

What is claimed is:

1. An engine structure for a vehicle, the engine structure comprising:
   an intake port configured such that a single flow path in an upstream portion of the intake port branches off into a pair of branch flow paths in a downstream portion of the intake port;
   a port plate provided in the single flow path of the intake port in a state of being longitudinally parallel to a flow path of the intake port so as to divide the single flow path of the intake port into upper and lower flow paths,
   wherein a downstream end of the port plate comprises:
      a first portion extended downstream into a first branch flow path of the pair of branch flow paths, and
      a second portion, wherein the first portion of the downstream end is extended downstream longer than the second portion of the downstream end such that the first portion of the downstream end is configured to induce swirl in a combustion chamber; and
   an injector provided in the intake port and configured to spray fuel to a second branch flow path of the pair of branch flow paths so as to inhibit fuel adhesion to the first portion of the downstream end.

2. The engine structure of claim 1, further comprising:
   a variable flap provided in an upstream portion of the port plate, and configured to be rotated so as to selectively block air flow from the lower flow path of the intake port divided by the port plate.

3. An engine structure for a vehicle, comprising:
   an intake port configured to introduce air and comprising an upstream portion and a downstream portion diverged into at least two branch ports through which the air flows into a combustion chamber;
   a port plate disposed in the intake port and configured to divide the air into at least two air flows, the port plate including an extension extended from the port plate toward the combustion chamber, wherein the extension forming part of downstream end of the port plate extends into one branch port of said at least two branch ports so as to induce swirl in the combustion chamber;
   an injector disposed in the intake port and configured to inject fuel into other branch port of said at least two branch ports so as to reduce fuel adhesion to the extension.

* * * * *